United States Patent
Bristol et al.

(10) Patent No.: US 7,318,759 B2
(45) Date of Patent: Jan. 15, 2008

(54) PRELOAD SYSTEM FOR BEARINGS IN A WATERJET PROPULSION APPARATUS

(75) Inventors: Brent L. Bristol, Phoenix, AZ (US); William B. Harper, Scottsdale, AZ (US); Arun Kumar, Chandler, AZ (US); Albert G. Selder, Gilbert, AZ (US); Jeffrey J. Aitchison, Chandler, AZ (US); Richard H. Dennis, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/448,442

(22) Filed: Jun. 7, 2006

(65) Prior Publication Data

US 2007/0287339 A1    Dec. 13, 2007

(51) Int. Cl.
*B63H 11/00* (2006.01)
(52) U.S. Cl. ............ 440/38; 60/221; 384/500; 384/551; 384/557
(58) Field of Classification Search .......... 440/38; 384/493, 499, 500, 501, 551, 557; 60/221, 60/222
See application file for complete search history.

(56) References Cited

U.S. PATENT DOCUMENTS

| | | |
|---|---|---|
| 4,226,485 A | 10/1980 | Pruvot |
| 4,473,309 A | 9/1984 | Box |
| 4,984,910 A | 1/1991 | Cogno |
| 5,028,152 A | 7/1991 | Hill et al. |
| 5,125,156 A | 6/1992 | Witte |
| 5,549,397 A | 8/1996 | Rode |
| 5,598,747 A | 2/1997 | Schetter et al. |
| 5,743,016 A | 4/1998 | Manne et al. |
| 5,785,434 A | 7/1998 | Rode |
| 6,135,641 A | 10/2000 | Smith |
| 6,250,815 B1 | 6/2001 | Picone et al. |
| 6,273,614 B1 | 8/2001 | Nicot |
| 6,293,704 B1 | 9/2001 | Gradu |
| 6,487,775 B2 | 12/2002 | Rode |
| 6,666,736 B2 * | 12/2003 | Fuse et al. ............ 440/38 |
| 6,817,774 B2 | 11/2004 | Wu et al. |
| 6,872,110 B2 * | 3/2005 | Fuse ............ 440/38 |
| 2001/0046340 A1 | 11/2001 | Shimomura |
| 2005/0005451 A1 | 1/2005 | Strait |
| 2005/0207689 A1 | 9/2005 | Gradu et al. |
| 2006/0018582 A1 | 1/2006 | Gradu et al. |

* cited by examiner

*Primary Examiner*—Lars A. Olson
(74) *Attorney, Agent, or Firm*—Ingrassia Fisher & Lorenz

(57) ABSTRACT

A preload system for bearings in a waterjet propulsion apparatus, the apparatus including a water intake section and a pumping unit including a bearing cartridge. The bearing cartridge is designed such that during operation a preload system provides tailoring between radial and axial thermal growths of a plurality of bearing components that comprise the bearing cartridge and such that an initial ambient temperature preload condition can be maintained or reduced during normal water mode operation conditions. The preload system includes a plurality of spacers that when positioned relative to the bearing components of the bearing cartridge prevent relative motion between the bearing components during land mode operation and maintain or reduce the initial ambient room temperature preload condition during normal water mode operation.

20 Claims, 2 Drawing Sheets

PRELOAD SYSTEM FOR BEARINGS IN A WATERJET PROPULSION APPARATUS

FIELD OF THE INVENTION

The present invention relates generally to waterjet propulsion apparatus. More particularly, the present invention relates to an improved waterjet propulsion apparatus including a thermally insensitive solid bearing preload system.

BACKGROUND OF THE INVENTION

The main components of a waterjet propulsion apparatus are an intake section, a pump or pumping unit, and a nozzle. Fluid enters the unit through the intake section, which scoops water into the apparatus and directs it in the aft direction. The pump includes a rotor, also referred to as an impeller, and a stator located downstream thereof, both of which are located within a fluid conduit or flowpath. The rotor is turned on a stationary spindle and is driven by the prime mover of the vehicle. The rotor adds energy to the fluid, which accelerates the fluid to a higher velocity and pressure. The swirl induced by the rotor is for the most part removed by the stator, which does not rotate. At the outlet end of the conduit, downstream of the stator, is located a funnel-shaped nozzle, which reduces the cross-sectional area of the flowing stream, increases the velocity of the fluid and thereby generates thrust. In some embodiments the stator and the nozzle are an integrated unit. The thrust produced by the pump propels a marine vehicle.

The waterjet apparatus further includes within the rotor, a bearing cartridge including a bearing cavity having contained therein a bearing assembly. The bearing assembly may include back-to-back bearings, the most common being taper roller bearings. In conventional terrestrial vehicles, the taper roller bearings depend on external radial loads to generate a reaction preload between the bearings. This type of bearing system typically depends on a prescribed axial clearance to prevent the generation of a thermally induced axial load component thereby avoiding a thermal run away condition. A thermal run away condition exists where additional bearing heat generation results in yet a higher axial preload and higher heat generation. This cycle can continue until the bearings are destroyed.

Typically, in the design of the waterjet propulsion apparatus, the rotor system may not be heavy enough to generate a sufficient reaction preload between the bearings in a water mode. In an amphibious vehicle, the bearings also may need to endure 40 g+ shock loads while operating in a land mode. This condition makes it desirable to design a bearing support system to prevent relative motion between components during potentially high impact land mode operation and maintain or reduce that preload during normal water operation.

Accordingly, it is desirable to provide for an improved waterjet propulsion apparatus that includes a thermally insensitive solid bearing preload system for the bearing assembly. In addition, it is desirable to extend the wear life of the component elements of the bearing assembly by providing for little or no movement between the components. Finally, it is desired to provide a system for preventing damage to the bearing assembly within the bearing cavity in a waterjet propulsion apparatus that is less costly as compared to the alternative of replacing a damaged bearing assembly with a new one. The present invention addresses one or more of these needs.

SUMMARY OF THE INVENTION

There has now been developed a waterjet propulsion apparatus including a preload system for the bearings that satisfies one or more of the above-noted deficiencies. In one embodiment, the waterjet propulsion apparatus includes a waterjet propulsion apparatus comprising a housing having at least a fluid intake section and a pumping unit disposed within the housing and in fluidic communication with the fluid intake section. The pumping unit comprising a rotor including a plurality of rotor blades coupled to a rotor hub and having a bearing cartridge having an initial ambient temperature preload condition. The bearing cartridge comprised of a plurality of bearing components. The pumping unit further comprises a stator having a fluid inlet disposed adjacent to and downstream of the rotor and a fluid outlet disposed downstream of the stator. The bearing cartridge further includes a thermally insensitive solid bearing preload system comprising a bearing support system that is preloaded using a plurality of spacers to prevent relative motion between the plurality of bearing components that comprise the bearing cartridge and provide adjustment of the initial preload condition at ambient temperatures.

In a further embodiment, still by way of example only, there is provided a pumping unit for a waterjet propulsion apparatus comprising a rotor comprising a plurality of rotor blades coupled to a rotor hub and having a bearing cartridge coupled to the rotor. The bearing cartridge having an initial ambient temperature preload condition and comprised of a plurality of bearing components. The pumping unit further comprising a stator having a fluid inlet disposed adjacent to the rotor, and a fluid outlet disposed downstream of the stator. The bearing cartridge comprises a bearing cavity. The plurality of bearing components are housed within a bearing cavity and comprise a bearing assembly having at least a plurality of roller bearing elements supported by a plurality of races, a bearing spindle, an outer ring, and a retainer. The bearing cartridge further includes a thermally insensitive solid bearing preload system comprising a bearing support system that is preloaded using a plurality of spacers to prevent relative motion between the plurality of roller bearing elements, the plurality of races, the outer ring, and the retainer and provide adjustment of initial preload condition at ambient temperature in response to radial and axial thermal growths of the plurality of bearing components.

In still a further embodiment, and still by way of example only, there is provided a pumping unit for a waterjet propulsion apparatus comprising a rotor comprising a plurality of rotor blades coupled to a rotor hub, a stator having a fluid inlet disposed adjacent to the rotor, and a fluid outlet disposed downstream of the stator and a bearing cartridge coupled to the rotor. The bearing cartridge having an initial ambient temperature preload condition. The bearing cartridge comprising a bearing cavity having a plurality of bearing components housed within the bearing cavity. The plurality of bearing components comprising a bearing assembly having at least a plurality of roller bearing elements supported by a plurality of races and a retainer. The bearing cartridge further includes a thermally insensitive solid bearing preload system comprising a retainer clamp spacer positioned to maintain a distance between the plurality of roller bearing elements and a shaft spacer positioned to maintain a distance between a clamping nut and the plurality of roller bearing elements, the retainer clamp spacer and the shaft spacer preventing relative motion between the plurality of roller bearing elements, the plurality of races, and the outer ring in the bearing assembly and providing adjustment of the initial ambient temperature preload condition in response to radial and axial thermal growths of the plurality of roller bearing elements, the plurality of races, the outer ring, the retainer, the spindle, the retainer clamp spacer and the shaft spacer.

Other independent features and advantages of the improved preload system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
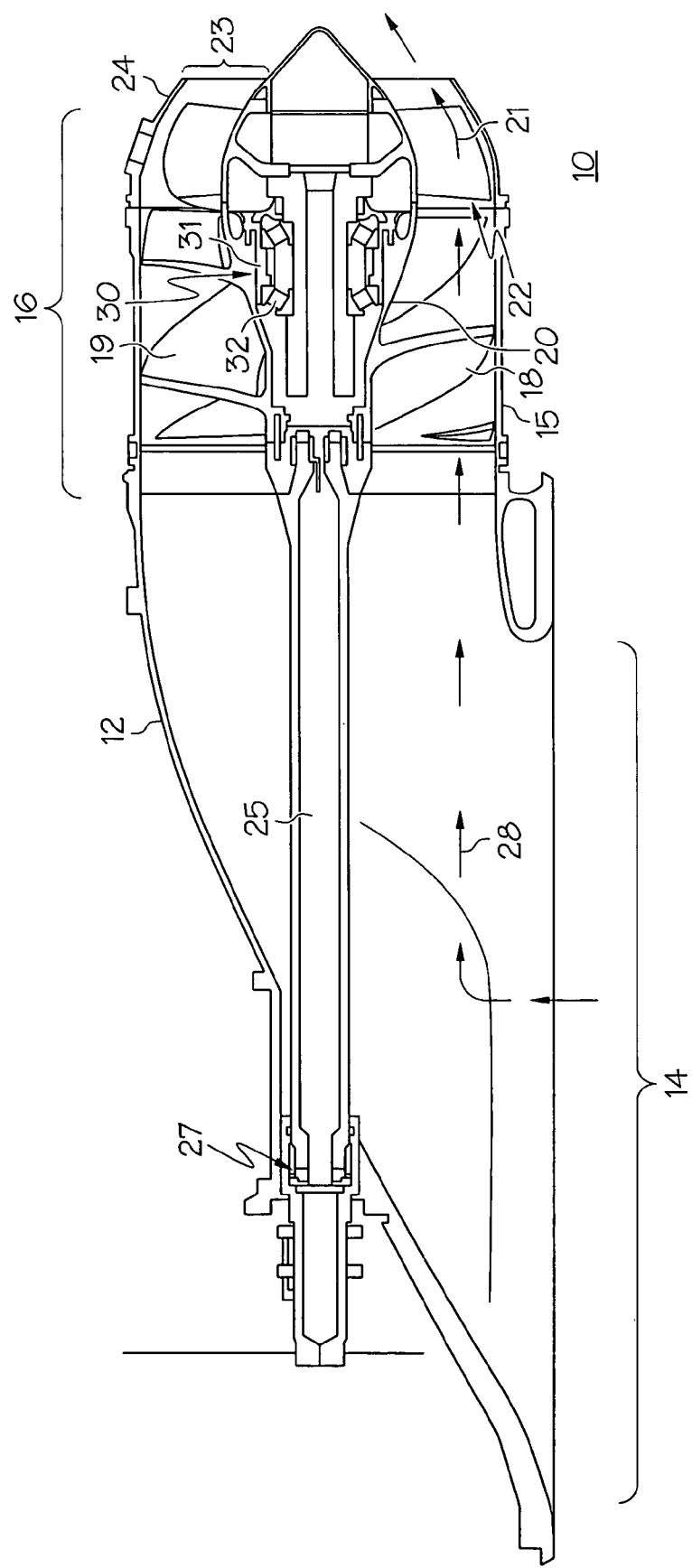
FIG. 1 is a side, cross-sectional view of a waterjet propulsion apparatus, consistent with an embodiment of the present invention.

Referring to the drawings, FIG. 1 is a simplified cross-sectional view of the main components of a waterjet propulsion apparatus 10. Waterjet propulsion apparatus 10 generally includes an inlet housing 12, having formed or contained therein a fluid intake section 14, and a pumping unit 16, which includes an impeller or rotor 18 (referred to hereafter as rotor 18) and a stator 21. The pumping unit 16 is disposed downstream and adjacent to the inlet housing 12 and in fluidic communication with the fluid intake section 14. The rotor 18 comprises a plurality of rotor blades 19 coupled to a rotor hub 20 and includes a bearing cartridge 30. The bearing cartridge 30 is defined by a bearing cavity 31 that houses a bearing assembly 32 therein. The stator 21 comprises a fluid inlet 22 disposed adjacent the rotor 18, and a fluid outlet 23 disposed downstream of the fluid inlet 22. The apparatus 10 further includes a stator housing or nozzle 24 where, during operation, a high pressure flow of fluid is discharged as a high velocity jet stream. A driveshaft 25 attaches at a coupling 27 to turn the rotor 18.

As indicated by directional arrows in FIG. 1, during operation, inlet housing 12, rotor 18 and stator 21 contribute to the definition of the flowpath of fluid 28 passing there through apparatus 10. More specifically, fluid enters through fluid intake section 14 and flows upward and rearward (or downstream) toward pumping unit 16. Fluid then passes through a pump housing 15, and continues downstream to the rotor 18. Substantially all of the fluid then reaches the stator 21 and exits through the tapered, integrated, nozzle 24 as a high velocity jet stream. The discharge of the high velocity jet stream generates a reaction force in the opposite direction of the flow path of fluid 28, which is transferred through the body of the waterjet apparatus 10 creating thrust and propelling the associated water vehicle forward.

Figure 2:
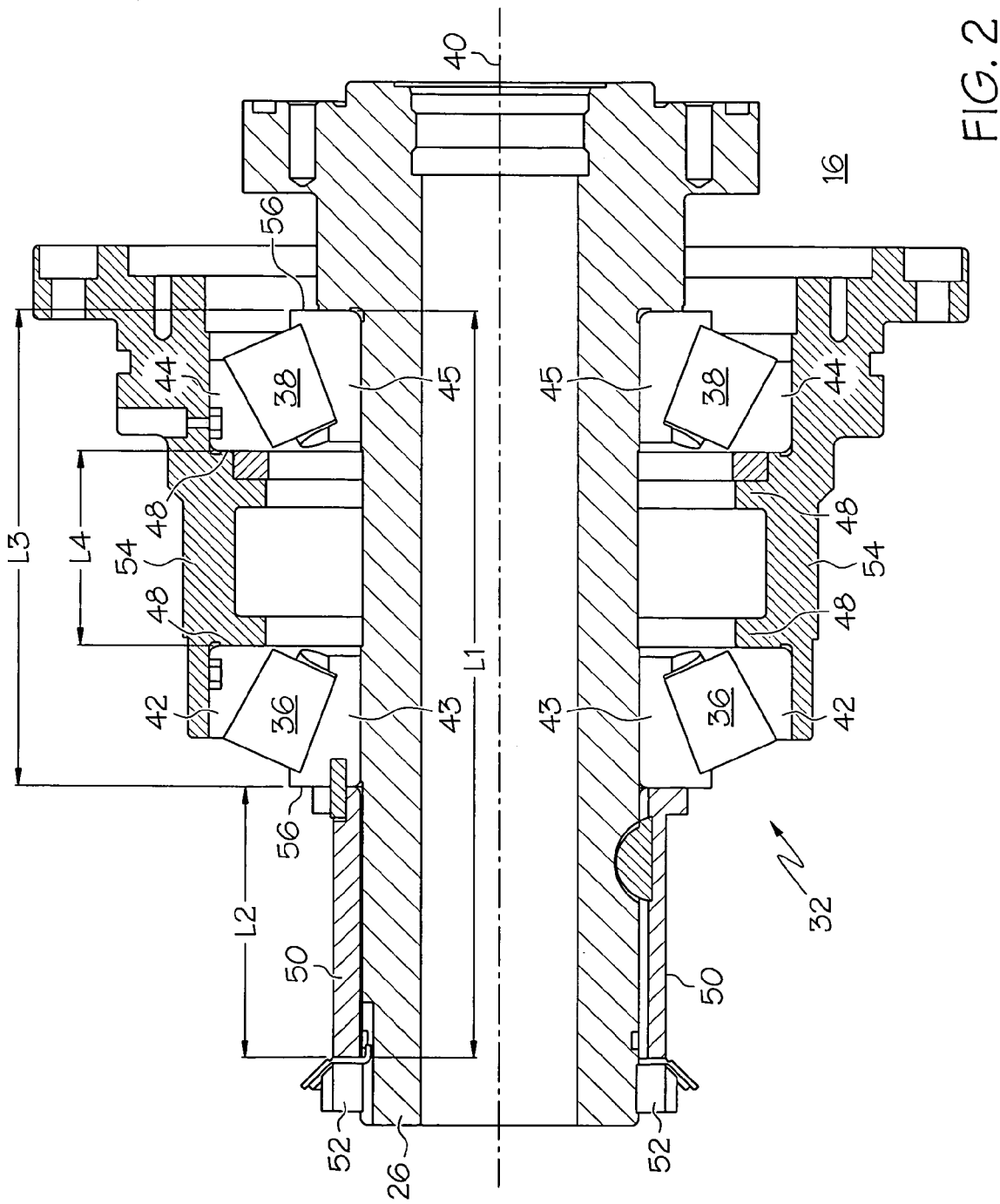
FIG. 2 is an enlarged side, cross-sectional view of a bearing cartridge of a waterjet propulsion apparatus, consistent with an embodiment of the present invention.

Referring now to FIG. 2, the features of a portion of the pumping unit 16, and in particular the bearing assembly 32 and thermally insensitive solid bearing preload system according to the present invention, are addressed in greater detail. As shown in FIG. 2, the structure is substantially rotationally symmetric about a centerline and axis of rotation 40. For convenience of description, the exterior housing 12 and the bearing cavity 31 (see FIG. 1) in which the bearing assembly 32 resides are not shown so that attention can be focused on the interior operating elements of the bearing assembly 32. More specifically, illustrated in simplified enlarged cross-sectional view is a portion of the stationary spindle 26 which supports the bearing assembly 32 and operates rotationally about the axis of rotation 40 as indicated. The bearing assembly 32 is positioned relative to the stationary spindle 26 and includes back-to-back bearings that in this particular embodiment are formed as taper roller bearings. More specifically, the bearing assembly 32 includes a first bearing roller element 36 spaced apart from a second bearing roller element 38. The bearing assembly 32 further includes a rotating frame member formed as an outer retainer 54 that in conjunction with the stationary spindle 26 conveniently supports a first bearing outer race 42, a first bearing inner race 43, the first bearing roller element 36, and a second bearing outer race 44, a second bearing inner race 45, and the bearing roller element 38.

As previously stated, in a typical waterjet propulsion apparatus design, the rotor or impeller system is typically not heavy enough to generate sufficient reaction preload in the bearing roller elements 36 and 38 during land mode operation. Accordingly, a bearing support system including a retainer clamp spacer 48 and a shaft spacer 50 are provided to set the distances between the roller bearing elements 36 and 38 and between the roller bearing elements 36 and 38 and a clamping nut 52. The retainer clamp spacer 48 is formed integral with the retainer 54. The bearing support system provides a highly preloaded condition against the retainer clamp spacer 48 and the shaft spacer 50 to prevent relative motion between components of the bearing assembly 32 during high impact land mode operation and maintain or reduce that reaction preload during normal water operation.

The system dimensions and thermal expansion coefficients are chosen to tailor changes in a bearing clamp load with changes in structural temperatures. More specifically, the preload of the bearing support system is strongly affected by the radial growths of the roller bearing elements 36 and 38, the races 42, 43, 44 and 45, as well as the axial growths of the retainer clamp spacer 48, the shaft spacer 50, and stationary spindle 26 used to clamp or preload the bearing system. During normal water mode operation, a balance can be tailored between the radial and axial thermal growths of the roller bearing elements 36 and 38, the races 42, 43, 44 and 45, and the retainer clamp spacer 48 and the spacer shaft 50 such that the initial solid room temperature preload can be maintained or reduced dependent upon land or water mode of operation.

One implementation of the bearing support system utilizes a stationary spindle 26 having a length L1 that extends beyond the bearing roller elements 36 and 38. The shaft spacer 50 formed of a material having a low coefficient of thermal expansion (CTE) and having a length L2 is used to bridge the additional length beyond the bearing roller elements 36 and 38 and the clamping nut 52. The bearing roller elements 36 and 38 are formed having a plurality of front faces 56 spaced a distance L3 apart. The retainer clamp spacer 48 is formed of a material having a CTE lower than the stationary spindle 26 and of a length L4. With knowledge of the device applications temperature distribution and the thermal expansion coefficients of the materials used for the bearing assembly 32 and more specifically the retainer clamp spacer 48 and the shaft spacer 50, the change in the system preload can be tailored by changing the lengths L1, L2, L3, and L4 in light of thermal growth coefficients to remain the same or decrease as the device transitions from an ambient temperature to its operating temperature.

The problem of an insufficient reaction preload in a bearing assembly of a waterjet apparatus can thus be solved by a bearing support system, and more particularly a thermally insensitive solid bearing preload system as disclosed herein. The preload system can be formed during initial bearing cartridge fabrication as a bearing cartridge structure modification or as a retrofit application through the addition of spacer lengths. The thermally insensitive solid bearing preload system provides a bearing support system that is highly preloaded against a plurality of spacers to prevent relative motion between bearing assembly components during high impact land mode operation and maintain or reduce that preload during normal water operation.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A waterjet propulsion apparatus comprising:
   a housing having at least a fluid intake section; and
   a pumping unit disposed within the housing and in fluidic communication with the water intake section, the pumping unit comprising:
      a rotor comprising a plurality of rotor blades coupled to a rotor hub;
      a bearing cartridge coupled to the rotor and having an initial ambient temperature preload condition, the bearing cartridge comprised of a plurality of bearing components; and
      a stator having a fluid inlet disposed adjacent the rotor, and a fluid outlet disposed downstream of the fluid inlet,
      wherein the bearing cartridge further includes a thermally insensitive solid bearing preload system comprising a bearing support system that is preloaded using a plurality of spacers comprising a retainer clamp spacer positioned to maintain a distance between the plurality of bearing components, a shaft spacer positioned to maintain a distance between the plurality of bearing components, and a clamping nut positioned a distance from one of the plurality of bearing components, the plurality of spacers configured to prevent relative motion between the plurality of bearing components that comprise the bearing cartridge and provide adjustment of the initial ambient temperature preload condition.

2. The apparatus of claim 1 wherein the bearing cartridge comprises a bearing cavity, the plurality of bearing components are formed within the bearing cavity and comprise a bearing assembly having at least a plurality of roller bearing elements supported by a plurality of inner races, outer races and a retainer.

3. The apparatus of claim 1 wherein the plurality of bearing components comprise a first roller bearing element and a second roller bearing element positioned back-to-back.

4. The apparatus of claim 3 wherein the first and second roller bearing elements are tapered roller bearings.

5. The apparatus of claim 3 wherein the retainer clamp spacer is positioned between the first and second roller bearing elements and the shaft spacer is positioned to extend between the first and second roller bearing elements and the clamping nut is positioned a distance from one of the first roller bearing or the second roller bearing element.

6. The apparatus of claim 1 wherein the retainer clamp spacer is formed integral with the retainer.

7. The apparatus of claim 1 wherein the retainer clamp spacer and the shaft spacer are each comprised of a material having coefficients of thermal expansion (CTE) such that the ambient temperature preload condition at the start of apparatus operation can be controlled during a structural thermal heating of the apparatus under normal water mode operation.

8. The apparatus of claim 1 wherein at least a portion of the plurality of bearing components are formed of a material having a coefficient of thermal expansion chosen to tailor changes in the preload of the thermally insensitive solid bearing preload system.

9. A pumping unit for a waterjet propulsion apparatus comprising:
   a rotor comprising a plurality of rotor blades coupled to a rotor hub and having a bearing cartridge coupled to the rotor, the bearing cartridge having an initial ambient temperature preload condition and comprised of a plurality of bearing components; and
   a stator having a fluid inlet disposed adjacent to and downstream of the rotor, and a fluid outlet disposed downstream of the stator,
   wherein the bearing cartridge further comprises a bearing cavity, the plurality of bearing components are housed within a bearing cavity and comprise a bearing assembly having at least a plurality of roller bearing elements supported by a plurality of races, a bearing shaft, an outer ring, and a retainer, the bearing cartridge further including a thermally insensitive solid bearing preload system comprising a bearing support system that is preloaded using a retainer clamp spacer positioned to maintain a distance between the plurality of roller bearing elements and a shaft spacer positioned to extend between the plurality of roller bearing elements to prevent relative motion between the plurality of roller bearing elements, the plurality of races, the outer ring, and the retainer and provide adjustment of the initial ambient temperature preload condition in response to radial and axial thermal growths of the plurality of bearing components.

10. The pumping unit of claim 9 wherein the plurality of roller bearing elements comprise a first roller bearing element spaced apart from a second roller bearing element, each of the first and second roller bearing elements having a front face, wherein the first and second roller bearings elements are positioned back-to-back.

11. The pumping unit of claim 10 wherein the first and second roller bearing elements are tapered roller bearing elements.

12. The pumping unit of claim 10 wherein the retainer clamp spacer is positioned between the first and second roller bearing elements and the shaft spacer is positioned to extend between the first and second roller bearing elements and a clamping nut is positioned a distance from the front face of one of the plurality of roller bearing elements.

13. The pumping unit of claim 9 wherein the retainer clamp spacer is formed integral with the retainer.

14. The pumping unit of claim 9 wherein the retainer clamp spacer and the shaft spacer each have a length tailored such that the ambient temperature preload condition at the start of the apparatus operation can be controlled during normal operation.

15. The pumping unit of claim 9 wherein the retainer clamp spacer and the shaft spacer are each comprised of a material having a coefficient of thermal expansion (CTE) such that the ambient temperature preload condition at the start of the apparatus operation can be controlled during normal operation.

16. A pumping unit for a waterjet propulsion apparatus comprising:
   a rotor comprising a plurality of rotor blades coupled to a rotor hub;
   a stator having a fluid inlet disposed adjacent the rotor, and a fluid outlet disposed downstream of the fluid inlet; and
   a bearing cartridge coupled to the rotor and having an initial ambient temperature preload condition, the bearing cartridge comprising a bearing cavity having a plurality of bearing components housed within the bearing cavity, the plurality of bearing components comprising a bearing assembly having at least a plurality of roller bearing elements supported by a plurality of races, an outer ring, and a retainer,
   wherein the bearing cartridge further includes a thermally insensitive solid bearing preload system comprising a retainer clamp spacer positioned to maintain a distance between the plurality of roller bearing elements and a shaft spacer positioned to maintain a distance between a clamping nut and the plurality of roller bearing elements, the retainer clamp spacer and the shaft spacer preventing relative motion between the plurality of roller bearing elements, the plurality of races, and the outer ring in the bearing assembly and providing adjustment of the initial ambient temperature preload condition in response to radial and axial thermal growths of the plurality of roller bearing elements, the plurality of races, the outer ring, the retainer, the retainer clamp spacer and the shaft spacer.

17. The pumping unit of claim 16 wherein the plurality of roller bearing elements comprise a first tapered roller bearing and a second tapered roller bearing positioned back-to-back within the bearing cavity.

18. The pumping unit of claim 16 wherein the retainer clamp spacer is formed integral with the retainer.

19. The pumping unit of claim 16 wherein the retainer clamp spacer and the shaft spacer each have a length tailored such that the ambient temperature preload condition at the start of the apparatus operation can be controlled during normal operation.

20. The pumping unit of claim 16 wherein the retainer clamp spacer and the shaft spacer are each comprised of a material having a coefficient of thermal expansion (CTE) such that the ambient temperature preload condition at the start of the apparatus operation can be controlled during normal operation.

* * * * *